No. 692,646. Patented Feb. 4, 1902.
C. L. FERRIOTT.
CORN OR COTTON PLANTER.
(Application filed Aug. 26, 1901.)
(No Model.)
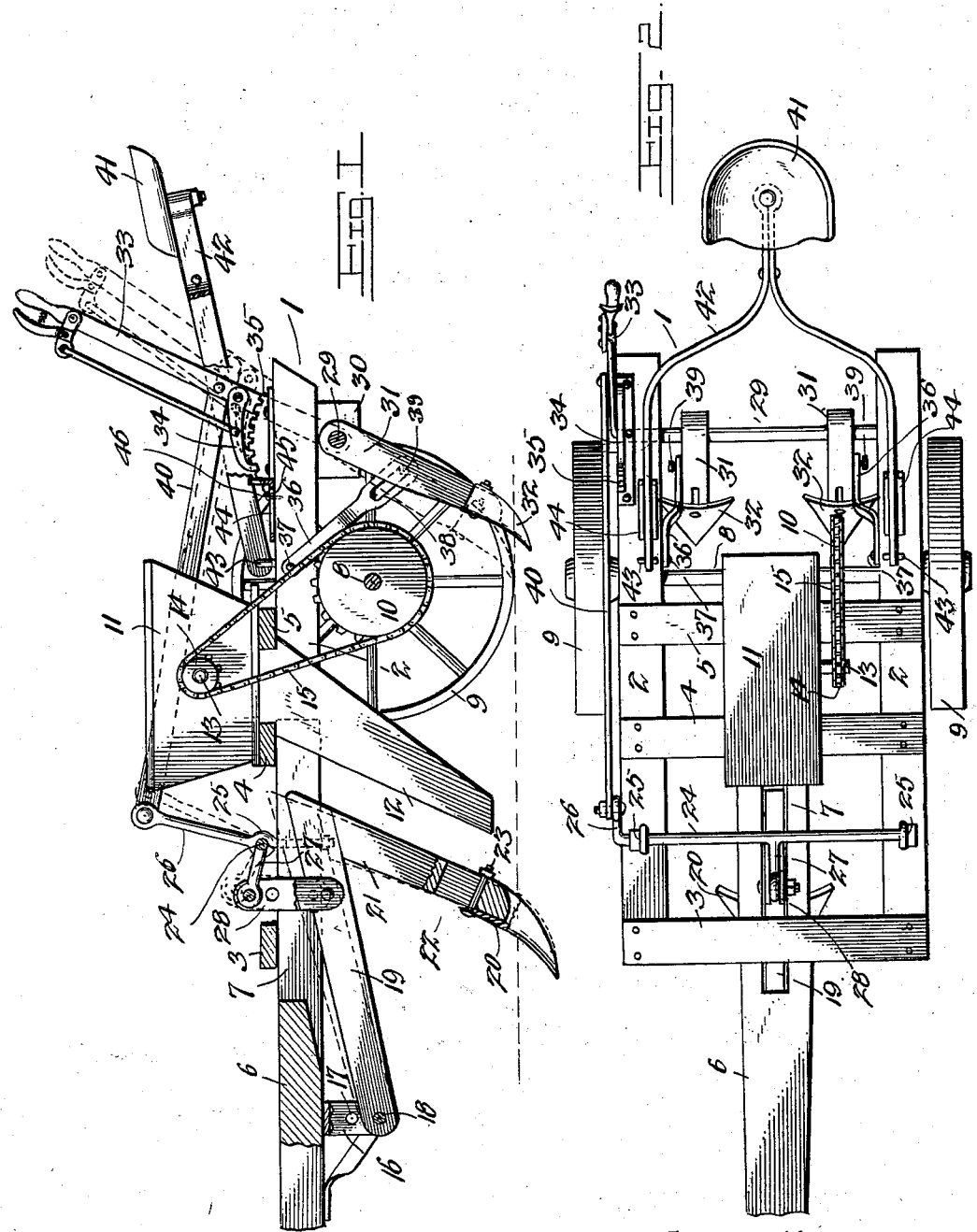
Witnesses
F. E. Alden.
J. W. Garner
C. L. Ferriott, Inventor.
by C. A. Snow & Co.
Attorneys

UNITED STATES PATENT OFFICE.

CHARLES L. FERRIOTT, OF BARTLETT, TEXAS.

CORN OR COTTON PLANTER.

SPECIFICATION forming part of Letters Patent No. 692,646, dated February 4, 1902.

Application filed August 26, 1901. Serial No. 73,337. (No model.)

*To all whom it may concern:*

Be it known that I, CHARLES L. FERRIOTT, a citizen of the United States, residing at Bartlett, in the county of Williamson and State of Texas, have invented a new and useful Corn or Cotton Planter, of which the following is a specification.

My invention is an improved combined corn and cotton planter; and it consists in the peculiar construction and combination of devices hereinafter fully set forth and claimed.

In the accompanying drawings, Figure 1 is partly a side elevation and partly a longitudinal sectional view of a cotton and corn planter constructed in accordance with my invention. Fig. 2 is a top plan view of the same.

The frame 1 of my improved planter comprises a pair of side beams 2, a cross-bar 3, which connects them together at their front ends, a cross-bar 4, which connects said side beams and is disposed at a suitable distance from the front end of the frame, and a similar cross-bar 5, which is disposed at a suitable distance in rear of the cross-bar 4 and at some distance from the rear ends of said side beams 2.

A tongue 6 is secured to the cross-bars 3 4 and is provided with a vertical slot 7 of suitable length. An axle-shaft 8 is journaled in suitable bearings under the side beams 2 at a suitable distance from the rear ends of said side beams, and on the said axle-shaft are ground-wheels 9, one of which is preferably loose, the other wheel being fast to the said axle-shaft to rotate the same. A sprocket-wheel 10 is secured on the said axle-shaft and rotates therewith.

On the cross-bars 4 5 is secured a hopper 11, which is provided with any suitable mechanism for dropping the seeds therefrom, and from the lower side of the said hopper depends a seed-spout 12, which conveys the seeds dropped from the hopper to the furrow. As here shown, the seed-dropping mechanism in the hopper is actuated by a shaft 13. I provide said shaft with a sprocket-wheel 14, which is connected to the sprocket-wheel 10 on the axle-shaft by an endless sprocket-chain 15, whereby power is conveyed from the axle-shaft to said shaft 13 to operate the seed-dropping mechanism.

A clevis 16 is secured to the under side of the tongue 6 at a suitable distance in front of the frame 1, depends from the said tongue, and is provided with a series of adjusting-openings 17. A bolt 18 connects the front end of the furrow-opening beam 19 to the said clevis, the said bolt being adapted to be fitted in either of the adjusting-openings 17 in order to adjust the front end of the beam vertically, so that the furrow-opener 20, which is carried by a standard 21, that depends from the rear end of the beam 19, may be caused to operate at any desired depth in the soil. The said standard 21 is provided with a vertical slot 22, and the bolt 23, which secures said furrow-opening shovel to said standard, is adjustable in said slot 22, so that the said furrow-opening shovel may be adjusted vertically on said standard as may be desired. A rock-shaft 24 is mounted in bearings 25 on the side beams 2 at points between the bars 3 4. Said rock-shaft has a rock-arm 26 at one end and is provided at its center with a rock-arm 27, disposed substantially at right angles to the rock-arm 26 and over the slot 7 in the tongue. A link 28 is pivotally connected to the said rock-arm 27 and to the beam 19, the said link extending downwardly through the slot 7, and it will be observed that the rear end of the said beam when the same is raised is also disposed in the said slot. A rock-shaft 29 is journaled in bearings 30 on the under sides of the side beams 2 at the rear ends thereof. To the said rock-shaft are secured a pair of standards 31, each of which is provided with a covering-shovel 32 of suitable form, the said covering-shovels being vertically adjustable on the said standards by means similar to the means employed for adjusting the furrow-opening shovel on the standard 21. At one end of the rock-shaft 29 is a lever 33. The same is provided with a dog 34. A segment-rack 35, which is substantially concentric with the rock-shaft 29, is secured on one of the beams 2. Hence the said rock-shaft by means of the said lever 33 may be turned to incline the standards 31 to any desired angle to raise or lower the covering-shovels 32, and the said rock-shaft may be set at any desired adjustment by engaging the dog 34 with the segment-rack 35. Link-bars 36 are provided which have their front ends pivotally connected to the side beams 2, as at 37. The rear ends of the said link-bars are provided with slots 38, which are engaged by pins or bolts 39, that project from the outer sides of the standards 31. Said link-bars maintain the said standards 31 in operative position and convey the draft thereto from the side beams of the frame, the slots 38 in said links admitting of lost motion of said standards on said links when said standards are by the rock-shaft 29 and lever 33 raised to such a position as to elevate the covering-shovels 32 above the ground. A link 40 connects the lever 33 to the crank or rock-arm 28 of rock-shaft 24. Hence it will be understood that the furrow-opener and coverers are simultaneously operated when they are raised or lowered.

Owing to the fact that the furrow-opener is carried at the rear end of the beam 19, which is pivoted at its front end, the tendency of the furrow-opener is to rise. The covering-shovels project radially from the rock-shaft 29, and hence the tendency of the stress of the draft is to move the coverers rearwardly. The connections between the beam 19 and the rock-shaft 29, whereby the same are simultaneously operated to raise or lower the furrow opener and coverers utilize the stress on the furrow-opener, which tends to rise to assist in raising the coverers, and hence a slight pull on the lever 33 is all that is required to raise both the furrow-opener and the coverers.

The seat 41 is carried at the rear end of a forked bar 42. The arms of the said bar 42 at their front ends are pivotally attached to the beams 2, as at 43. On the said beams and under the said arms of said forked bar are adjusting-slides 44. The same bear under the said arms of said forked bar and are provided with vertical longitudinal slots 45, engaged by bolts 46, which secure said slides on said beams 2, while admitting of the longitudinal adjustment of the slides. By adjusting the latter longitudinally the seat 41 may be raised or lowered, as may be required.

Having thus described my invention, I claim—

1. In a planter, the combination of a beam pivotally supported at its front end whereby its rear end is adapted to be raised and lowered, a furrow-opener carried at the rear end of said beam, a rock-shaft having a rock-arm connected to said beam to raise and lower the said furrow-opener, a rock-shaft having a hand-lever, covering-shovels carried by said last-mentioned rock-shaft and connections between said hand-lever and said first-mentioned rock-shaft, whereby said rock-shafts may be simultaneously operated to raise and lower said furrow-opener and coverers, substantially as described.

2. In a planter, the combination of a wheeled frame, a beam pivotally connected at its front end to the frame, whereby its rear end is adapted to be raised and lowered, said beam carrying a furrow-opener at its rear end, a rock-shaft having a rock-arm connected to said beam to raise and lower said furrow-opener, bearings for said rock-shaft on said wheeled frame, a rock-shaft in bearings at the rear end of the frame and having a hand-lever, covering-shovels carried by said last-mentioned rock-shaft and disposed radially with reference thereto, a link-rod connecting said hand-lever to a crank-arm on said first-mentioned rock-shaft and means to lock said hand-lever at any desired adjustment, substantially as described.

In testimony that I claim the foregoing as my own I have hereto affixed my signature in the presence of two witnesses.

CHARLES L. FERRIOTT.

Witnesses:
J. H. WALLACE,
R. S. THOMPSON.